(12) United States Patent
Lampenscherf et al.

(10) Patent No.: US 12,224,623 B2
(45) Date of Patent: Feb. 11, 2025

(54) ELECTRIC MOTOR

(71) Applicant: Siemens Aktiengesellschaft, Munich (DE)

(72) Inventors: Stefan Lampenscherf, Poing (DE); Gotthard Rieger, Munich (DE); Michael Krispin, Vaterstetten (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 247 days.

(21) Appl. No.: 17/928,480

(22) PCT Filed: Apr. 23, 2021

(86) PCT No.: PCT/EP2021/060730
§ 371 (c)(1),
(2) Date: Nov. 29, 2022

(87) PCT Pub. No.: WO2021/244803
PCT Pub. Date: Dec. 9, 2021

(65) Prior Publication Data
US 2023/0208212 A1    Jun. 29, 2023

(30) Foreign Application Priority Data

Jun. 5, 2020 (DE) ..................... 10 2020 207 060.1
Jun. 19, 2020 (DE) ..................... 10 2020 207 625.1

(51) Int. Cl.
*H02K 1/02* (2006.01)
*B22F 3/04* (2006.01)
(Continued)

(52) U.S. Cl.
CPC ............ *H02K 1/02* (2013.01); *B22F 3/04* (2013.01); *B22F 3/10* (2013.01); *H01F 1/14* (2013.01);
(Continued)

(58) Field of Classification Search
CPC ..... H02K 1/02; B22F 3/04; B22F 3/10; H01F 1/14
See application file for complete search history.

(56) References Cited

U.S. PATENT DOCUMENTS 5,382,862 A    1/1995 Ward et al. ............... 310/263
6,509,667 B1   1/2003 El-antably et al. ....... 310/261.1
(Continued)

FOREIGN PATENT DOCUMENTS

DE    4105352 A1    8/1992    ............... H02K 1/02
DE    69305118 T2   2/1997    ............... H02K 1/02
(Continued)

OTHER PUBLICATIONS

DE-102007060945-A1_translate (Year: 2009).*
(Continued)

*Primary Examiner* — Tulsidas C Patel
*Assistant Examiner* — Mohammed Ahmed Qureshi
(74) *Attorney, Agent, or Firm* — Slayden Grubert Beard PLLC

(57) ABSTRACT

Various embodiments of the teachings herein include an electric motor. In some embodiments, the motor includes: a stator; and a moving component comprising an iron-based soft-magnetic structural material including crystallites of a ferromagnetic iron-based alloy separated by grain boundaries, wherein there is interlayer-free contact between the crystallites at grain boundaries. The structural material comprises ceramic fibers. A content of the ceramic fibers is between 0.2% and 10% by volume. An aspect ratio of the ceramic fibers is less than 0.1.

15 Claims, 4 Drawing Sheets

(51) Int. Cl.
  *B22F 3/10* (2006.01)
  *H01F 1/14* (2006.01)
(52) U.S. Cl.
  CPC ...... *B22F 2207/13* (2013.01); *H02K 2213/03* (2013.01)

(56) References Cited

U.S. PATENT DOCUMENTS

| | | | |
|---|---|---|---|
| 6,599,465 B1 | 7/2003 | Reppel et al. | 419/5 |
| 2006/0226724 A1 | 10/2006 | Cullen et al. | 310/156.28 |
| 2010/0045120 A1 | 2/2010 | Kitano et al. | 310/44 |
| 2015/0089987 A1* | 4/2015 | Inoue | B21B 27/03 72/199 |
| 2015/0243420 A1 | 8/2015 | Miyamura et al. | 75/252 |
| 2020/0168377 A1 | 5/2020 | Mitomi et al. | |

FOREIGN PATENT DOCUMENTS

| | | | | |
|---|---|---|---|---|
| DE | 19912470 A1 | 10/2000 | ................ | B22F 7/06 |
| DE | 10143253 A1 | 4/2002 | ............. | H02K 15/02 |
| DE | 602006000885 T2 | 7/2008 | ............... | H02K 1/27 |
| DE | 10 2007 060 945 | 6/2009 | ............... | H02K 1/02 |
| DE | 102007060945 A1 * | 6/2009 | ............... | H02K 1/02 |
| DE | 112007003173 T5 | 3/2010 | ............... | B22F 1/00 |
| DE | 112018003960 T5 | 5/2020 | ............... | B22F 1/00 |
| EP | 2 127 784 | 12/2009 | ............... | B22F 1/00 |
| JP | 09233737 A | 9/1997 | ............... | H02K 1/02 |
| JP | 2004 359990 | 12/2004 | ............. | C22C 14/14 |
| JP | 2007 131886 | 5/2007 | ............. | C22C 47/14 |
| WO | 2011/100991 A1 | 8/2011 | ............... | H02K 1/27 |

OTHER PUBLICATIONS

German Office Action, Application No. 1020202075625.1, 7 pages, Mar. 4, 2021.

Search Report for International Application No. PCT/EP2021/060730, 6 pages, Aug. 2, 2021.

Yu R H et al. "High Temperature Soft Magnetic Materials: FeCo Alloys and Composites" IEEE Transactions on Magnetics, IEEE Service Center, New York, NY, US. vol. 36, No. 5, ISSN: 0018-9464, XP011033289, Sep. 1, 2000.

* cited by examiner

ELECTRIC MOTOR

CROSS-REFERENCE TO RELATED APPLICATIONS

This application is a U.S. National Stage Application of International Application No. PCT/EP2021/060730 filed Apr. 23, 2021, which designates the United States of America, and claims priority to DE Application No. 10 2020 207 625.1 filed Jun. 19, 2020 and DE Application No. 10 2020 207 060.1 filed Jun. 5, 2020, the contents of which are hereby incorporated by reference in their entirety.

TECHNICAL FIELD

The present disclosure relates to electric motors.

BACKGROUND

Electric motors generally have a stator and a moving component. The moving component is a rotor in a rotating machine, or a slide in a linear motor. Both the stator and the moving component, called rotor hereinafter, comprise electrical windings that are generally wound around soft-magnetic cores. In the production of soft-magnetic cores, what are called laminated stacks are generally used according to the prior art. In the case of these, soft-magnetic metal sheets are correspondingly punched, or laser separation methods are used to cut out a particular structure, and a multitude of these metal sheets are combined to form a three-dimensional body.

However, magnetic materials are also produced for many applications outside the field of electrical machines as powder composites. The magnetizable particles are either polymer-bound or sintered and hot-pressed. Especially the hot-compacted high-performance soft-magnetic materials, called SMCs, based on iron have the advantage of good eddy current suppression coupled with low losses and the possibility of three-dimensional flux guidance on account of isotropic properties. This advantage is at the cost of the problem of an opposing deterioration in strength properties. These soft-magnetic materials therefore do not show adequate strengths at present for applications with high mechanical stress, for example electrical drives, but especially at high temperatures, since the centrifugal/centripetal forces and vibrations exceed the mechanical durability of these materials. Therefore, for rotating electrical machines, in general, the described laminated stacks composed of a multitude of rolled electrical steel sheets are used. The individual metal sheets obtained by the forming and by means of non-magnetic additives such as silicon or aluminum do take on improved strength properties and eddy current suppression via a reduction in electrical resistance, but, just like currently known sinter materials, increasingly meet their technological performance limits in the event of elevated demands on motors, especially their mechanical strength limits. Moreover, good mechanical magnetic flux guidance exists only in the individual metal sheet levels.

SUMMARY

Teachings of the present disclosure describe a motor having, by comparison with conventional electric motors, improved eddy current suppression coupled with low electrical losses, and the possibility of three-dimensional magnetic flux guidance, with the corresponding magnetic cores of the electric motor having distinctly higher mechanical strength compared to conventional SMC materials and conventional laminated stacks, hence enabling higher speeds of rotation or movement of the electric motor. For example, some embodiments of the teachings herein include an electric motor having a stator (4) and a moving component (6), wherein the moving component (6) comprises an iron-based soft-magnetic structural material (8), characterized in that the soft-magnetic structural material (8) includes crystallites (10) of a ferromagnetic iron-based alloy separated by grain boundaries (12), wherein there is interlayer-free contact between the crystallites (10) at grain boundaries (12) and the structural material (8) contains ceramic fibers (14), wherein the fiber content (16) is between 0.2% by volume and 10% by volume, and the aspect ratio of the fibers (14) is less than 0.1.

In some embodiments, the fiber content (16) is between 0.2% by volume and 5% by volume.

In some embodiments, the fiber content (16) is between 2% by volume 4% by volume.

In some embodiments, the aspect ratio of the fibers (14) is less than 0.5.

In some embodiments, the aspect ratio of the fibers (14) is less than 0.2.

In some embodiments, the ceramic fibers (14) are alumina fibers.

In some embodiments, the ceramic fibers (14) have a length (18) between 70 μm and 300 μm.

In some embodiments, the ceramic fibers (14) have a length (18) between 70 μm and 150 μm.

In some embodiments, the ceramic fibers (14) have a diameter (20) between 4 μm and 10 μm.

In some embodiments, the ceramic fibers (14) have a diameter (20) between 5 μm and 7 μm.

In some embodiments, 80% of the crystallites (10) have a particle diameter (22) greater than 10 μm.

In some embodiments, the moving component (6) is a rotor (7).

In some embodiments, the soft-magnetic structural material (8) has been produced by a hot isostatic pressing method.

In some embodiments, the soft-magnetic structural material (8) has been produced by a cold isostatic pressing method, followed by sintering.

In some embodiments, the soft-magnetic structural material (8) has been produced by a paste-based method, especially metal injection molding (MIM) or a thick-film printing method with subsequent debindering and sintering.

BRIEF DESCRIPTION OF THE DRAWINGS

Further configurations of the teachings herein and further features will be elucidated in detail by the figures that follow. These are purely schematic and illustrative diagrams that do not constitute any restriction of the scope of protection. The figures show.

DETAILED DESCRIPTION

Figure 1:
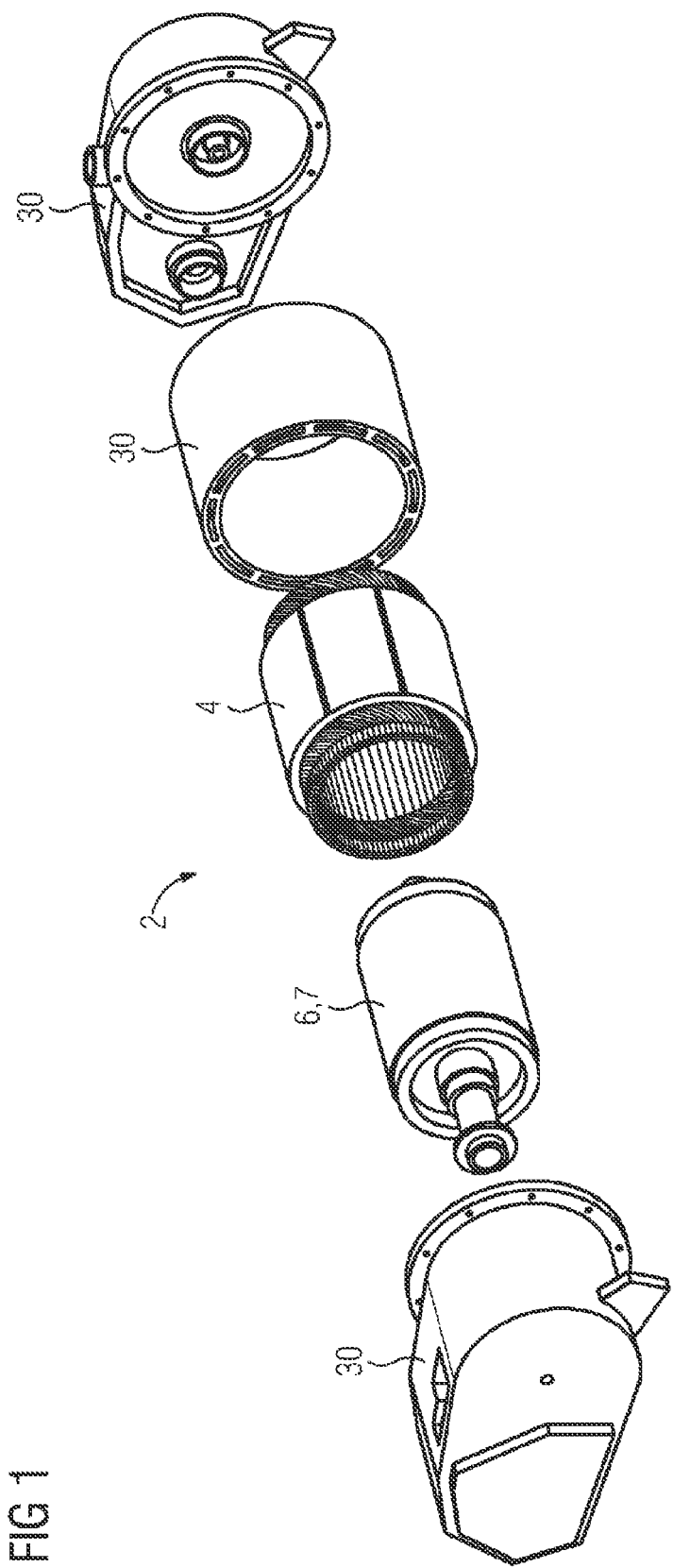
FIG. 1: a three-dimensional exploded diagram of a typical electric motor with rotor, stator, and housing.

The electric motors described herein comprise a stator and a moving component, which is a secondary in the case of a linear motor and a rotor in the case of a rotary motor. In addition, at least the moving component, i.e. a rotor in a special case, includes an iron-based soft-magnetic structural material. In some embodiments, the soft-magnetic structural material includes crystallites, by way of simplification hereinafter also called particles of a ferromagnetic iron-based alloy that are separated by grain boundaries. In addition, individual particles of the ferromagnetic iron-based alloys are free of interlayers, which means that the particles are in direct contact without formation of an interlayer between the individual particles, for example a polymer matrix. In addition, the structural material, in order to increase mechanical strength, contains ceramic fibers having a fiber content calculated in percent by volume of between 0.2% by volume and 10% by volume. The aspect ratio of the fibers here is such that it is less than 0.1.

The term "soft-magnetic materials" means materials that can be readily magnetized in a magnetic field. This magnetic polarization may be generated, for example, by means of an electrical current in a current-carrying coil around a magnetic core, or by the presence of a permanent magnet. In all soft-magnetic materials, the polarization leads to a magnetic flux density several times higher than generated by the external magnetic field in air. By contrast with hard-magnetic materials, which are permanent magnets, for example, hysteresis loss in soft-magnetic materials is kept small on reversal of magnetism, for example in a transformer or in an alternating field in generators and electric motors, meaning that the magnetic field at which magnetism is reversed is low (called coercive field). Since not only hysteresis loss but also eddy current loss is to be reduced, resistance-increasing alloy additions such as silicon and aluminum (in the case of iron alloys) are used in the case of typical grid frequencies, and the thickness of the metal sheets in a sheet metal stack (also called laminated stack) is reduced.

What is meant here by the term "iron-based" is that the particles comprise a ferromagnetic alloy having iron as the alloy element with the greatest proportion in percent by weight. At the same time, further inorganic additions are not ruled out, especially those that affect the magnetic properties.

By contrast with the prior art, the magnetic core for the moving component here is a structural material which, as such, by contrast with purely planar metal sheets, can be represented in three-dimensional form and hence reflects the structure of the core analogously to the manner of a core pack in the prior art. Unlike the SMCs described, the soft-magnetic structural material used in the electric motors described herein also does not include any polymer-based matrix materials that would distinctly lower the strength of that material. By contrast, ceramic fibers having a relatively small fiber content of less than 10% but at least 0.2% by volume are present, which assure high mechanical strengths at high rotations or high speeds of the electric motor.

In some embodiments, the fiber content between 0.2% and 5% brings a distinct increase in strength and simultaneously also a considerable reduction in conductivity based on the conductivity of the pure iron particles, which in turn reduces eddy current losses of the soft-magnetic structural material. This reduction in conductivity is much greater within the range of values mentioned and would be expected from a mathematical estimate, for example via a Bruggemann correlation.

In some embodiments, the percent by volume range encompassed by the fiber content may also be less than 5%, specifically between 0.2% and 4% by volume, or between 2% by volume and 5% by volume. This is the range within which the strength increases significantly as a result of the addition of ceramic fibers and there is a maximum reduction in conductivity based on pure iron in order, as already mentioned, to minimize eddy current losses and to increase strength to the same degree. The shape of the ceramic fibers results from their aspect ratio, which is less than 0.1. This means that the length of the fibers is at least ten times greater than their average diameter. This aspect ratio includes both short fibers and moderate or long fibers/continuous fibers. Short fibers have the advantage over long fibers that they are less costly to produce and are easier to introduce into the structural material. Long fibers, by contrast, generally have a higher strength, especially in the case of three-dimensional configurations with complex topologies. In most cases, it has been found that the addition of short fibers in the order of magnitude of 100 µm, between 70 µm and 150 µm, and a diameter of about 6 µm, between 4 µm and 10 µm, or between 5 µm and 7 µm, already gives a very large increase in the strength of the soft-magnetic structural material compared to unreinforced sintered materials. In addition, it has been found to be useful that the ceramic fibers may be configured as alumina fibers, since these have high strength coupled with low costs. Silicon carbide fibers and titanium boride fibers are likewise useful.

The diameter of the individual iron-based particles or of the crystallites in a (matrix) microstructure may be greater than 10 µm. It has been found that particles having a diameter of more than 10 µm in the original state have particularly good soft-magnetic properties, and their polarization can be reversed very quickly (low coercive field strength), such that even high rotations of up to 30 000/min, i.e. in the kilohertz range, in the rotation of a rotor are thus achievable. The particle diameter is understood here to mean the maximum particle diameter, such that the particles cannot be passed through a square sieve opening section having an edge length of 10 µm, i.e. are retained by such a sieve.

In some embodiments, the soft-magnetic structural material is produced by a hot pressing method (e.g. hot isostatic pressing). This production method makes it possible to produce the structural material essentially in near net shape, and necessitates only a minor degree of mechanical reworking. In some embodiments, it is also appropriate to subject the structural material to cold isostatic pressing and to subject it to a subsequent sintering method. Another option is processing as a highly filled paste or compound with subsequent debindering (removal of organic constituents) and subsequent sintering (with or without pressure). These production methods characterize the material in terms of its main features, and contrast with the customary laminated stacks in rotating electrical machines, which, as already mentioned, result from punching or lasering of planar rolled sheets and joining thereof to give a three-dimensional body. The corresponding soft-magnetic materials may be produced here by the isostatic shaping methods described.

Figure 2:
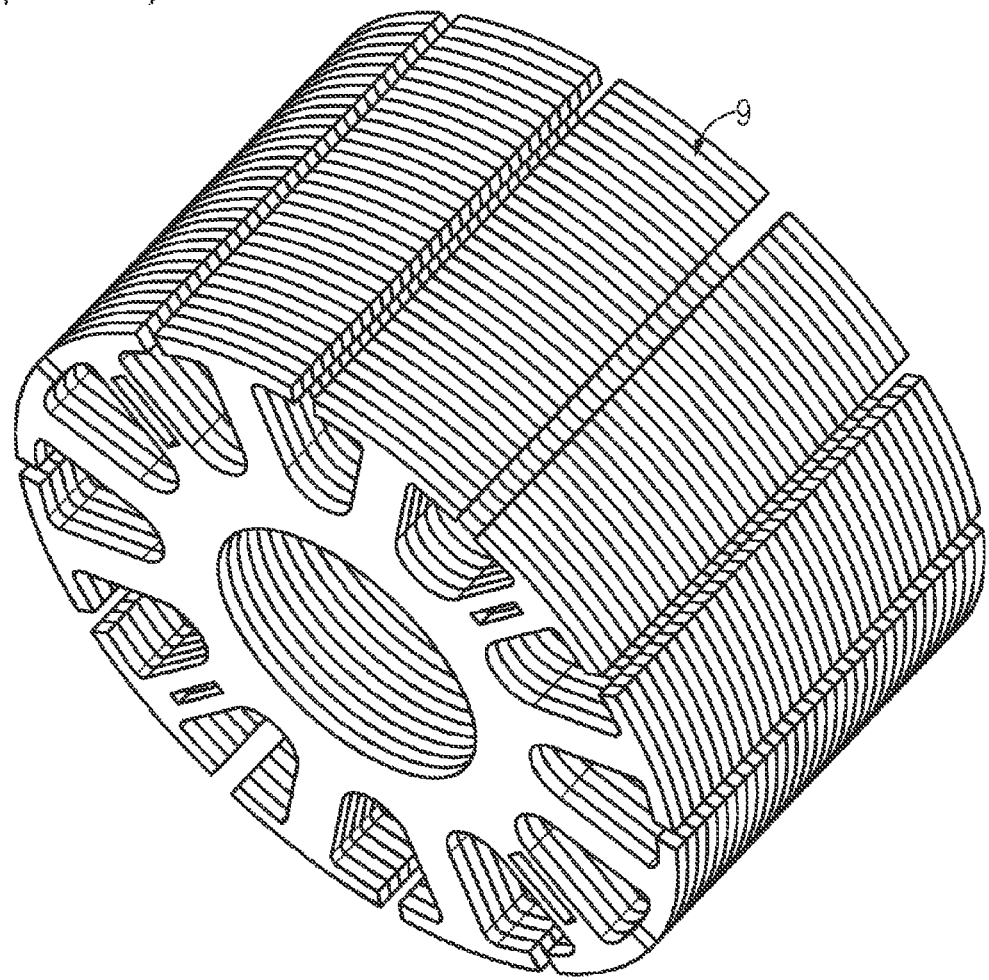
FIG. 2: a laminated stack for an electric motor according to the prior art.

FIG. 1, for the sake of clarity, shows an exploded diagram of an electric motor 2, configured here as a rotating motor. This has three housing portions 30, the actual motor comprising a stator 4 and a moving component 6, configured here in the form of a rotor 7. In principle, what is described hereinafter can also be applied to a linear motor, with the elucidation of a rotating motor being chosen by way of example in FIGS. 1, 2, and 3.

The rotor 7 here, in the case of prior art motors, has what is called a laminated stack 9 that forms a magnetic core for the coil winding required. This laminated stack is assembled from individual metal sheets and hence forms a structural body. The individual metal sheets, before being assembled and bonded, are punched out or given their characteristic structure by a laser separation method, which constitute grooves, for example, in three dimensions. This is a customary process according to prior art, but this has the disadvantage that the laminated stacks 9, similarly to powder composites, are endowed with insufficient strength when high centrifugal forces or high speeds and accelerations act thereon.

Figure 3:
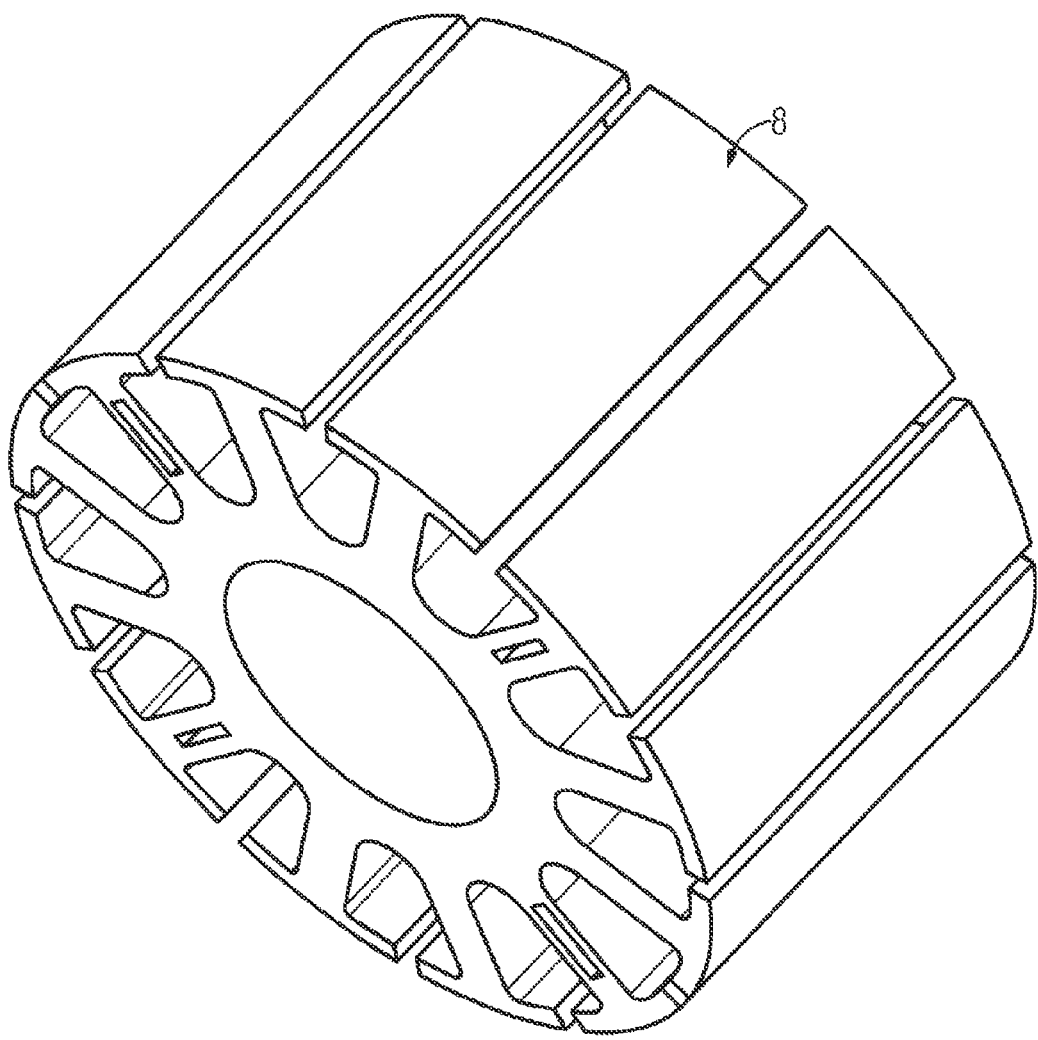
FIG. 3: a soft-magnetic structural material, iron-based alloy reinforced with ceramic fibers, incorporating teachings of the present disclosure.

In FIG. 3, by contrast, a magnetic core of identical topography is produced in the form of a soft-magnetic structural material 8 that satisfies the same functionality use in the electric motor 2 as the laminated stack 9, but is of a completely different configuration in terms of materials. The soft-magnetic structural material 8 according to FIG. 3 differs not only from the laminated stack 9 but also from conventional SMC materials comprising iron particles embedded in polymer matrix.

Figure 4:
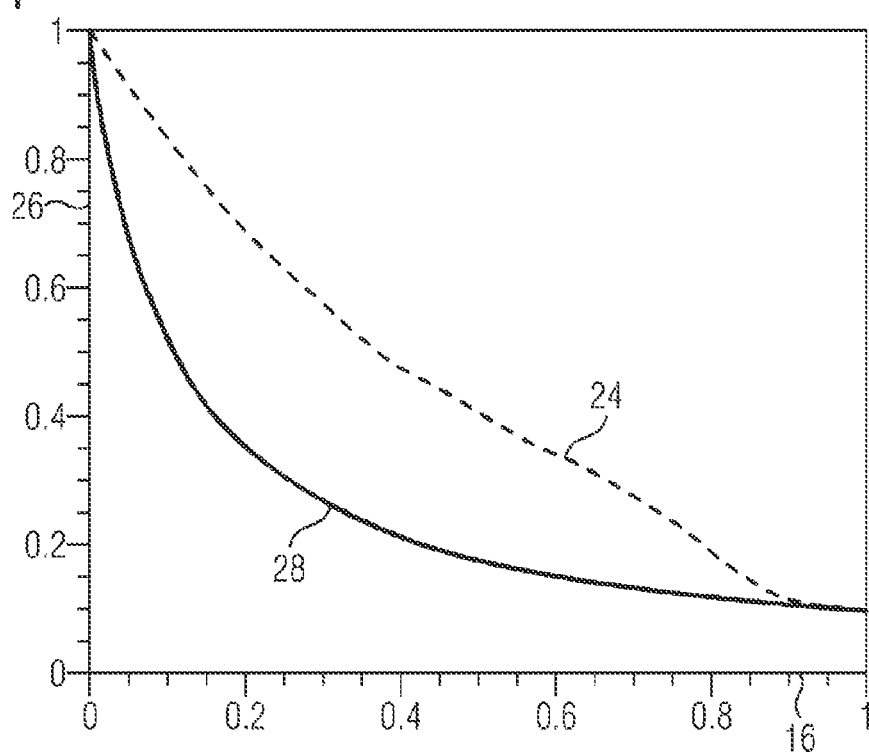
FIG. 4: a correlation between the fiber content of the structural material and the conductivity thereof.

The novelty of the structural material 8 from FIG. 3 results firstly from a finding that can be inferred from FIG. 4. This firstly addresses the magnetic or electrical losses that are caused by the iron core of a rotor or of the motor overall. These losses are also referred to as iron losses. The iron losses overall can be described by complex mathematical relationships. In simplified terms, these are the product of addition of what are called hysteresis losses, eddy current losses, and additional losses that are generally attributable to the interplay of eddy current and domain wall movements of the individual magnetic domains. In the case of the parameters that determine the individual losses, there are opposing effects here, and also resulting trade-offs. In order to minimize eddy current losses, which constitute a very high proportion of the iron losses, however, it is important to minimize the electrical conductivity of the particles.

It has been found according to FIG. 4 that a relatively small proportion by volume of ceramic fibers (plotted on the x axis is a proportion by volume between 0 and 1; for conversion to % by volume, the numerical values given must be multiplied by 100), which is already effective at about 0.2% by volume and reaches linear saturation at a fiber content of about 10%, causing very significant lowering of the conductivity 26. The conductivity 26, plotted on the y axis in FIG. 4, is plotted here as the normalization of the electrical conductivity of the fiber-reinforced material to the electrical conductivity of iron.

By mathematical modelling, as indicated, for example, by the Bruggemann equation 24, shown by a dotted line in FIG. 4, this significant lowering of electrical conductivity would not have been expected as a result of a relatively low fiber content. On the other hand, however, even a very small proportion of fiber reinforcement brings about a distinct increase in tensile strength, the effect of which is that fiber reinforcement can have a considerable positive influence both on mechanical and electrical properties of the structural material 8.

The soft-magnetic structural material 8 according to FIG. 3 differs in terms of its construction from conventional magnetic materials in that it is firstly formed from iron particles, these being iron-based alloys in which iron accounts for the greatest individual proportion, preferably more than 50% of the proportion by weight. These particles 10, as mentioned, are reinforced by ceramic fibers 14, here in the form of alumina fibers. The microstructure of the structural material 8 is shown in schematic form in FIG. 5, which will be discussed hereinafter. By contrast with SMC materials, grain boundaries 12 disposed between the particles 10 are free of interlayers, which means that there is no need to provide any additional matrix, especially any polymer matrix, in which the particles 10 would be intercalated. The particles 10 are thus in contact at the grain boundaries at the elemental alloy level, and it is of course quite possible here for agglomerates of different elements to be prevalent, and for there also to be precipitation at the grain boundaries 12.

As already mentioned and as can be inferred from FIG. 4, the fiber content may be between 0.2% and 10% by volume. A particularly significant downward kink in conductivity and still a very good increase in strength of the material 8 is observed between a fiber content of 0.2% and 5% by volume, and therefore the addition of fibers is within this range. Moreover, in some embodiments, the ceramic fibers 14 are short fibers that have a length between 70 and 300 µm. Particularly good properties are possessed by short fibers of alumina having a length of 100 µm. These fibers 14 have a diameter 20 of about 6 µm, e.g. fiber diameter being between 5 and 10 µm.

Figure 5:
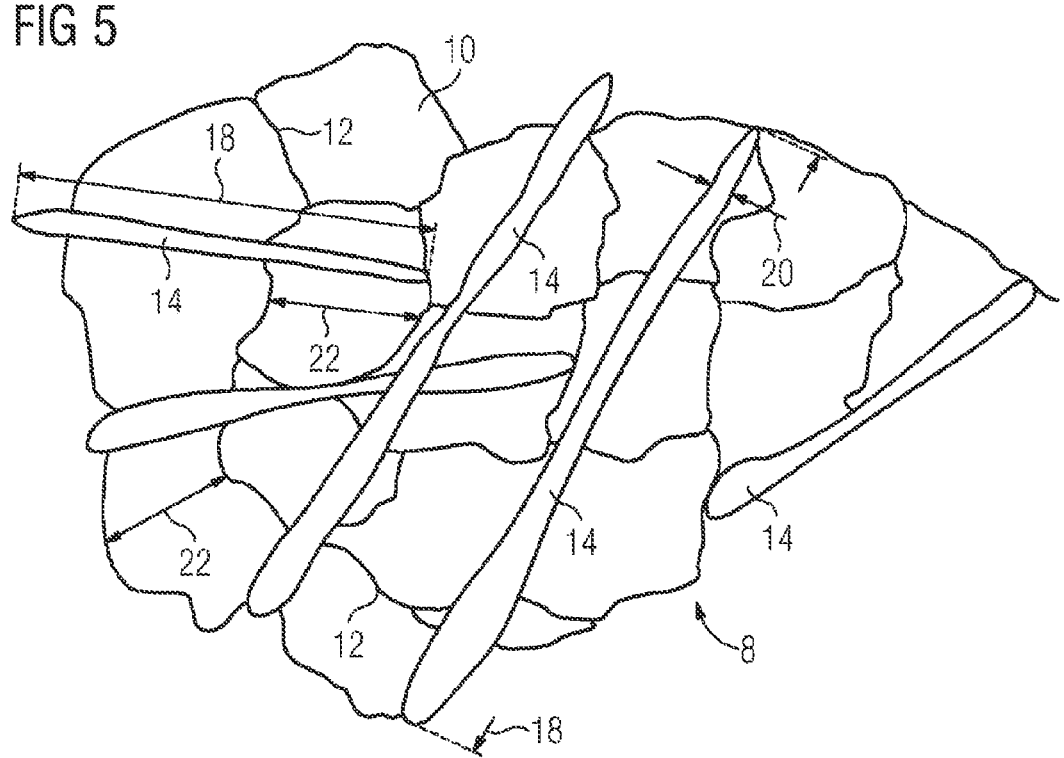
FIG. 5: a schematic diagram of the microstructure of the soft-magnetic structural material incorporating teachings of the present disclosure.

FIG. 5 shows by way of example how the fibers 14 are intercalated into the grain structure of the particles 10. The fibers 14 here may run along grain boundaries 12, where there are phase effects between the individual materials, i.e. the iron-based alloy and alumina fibers in this case. As a result of the shaping process, such as hot isostatic pressing, there are sintering effects between the particles 10 at the grain boundaries 12, given that a monolithic transition between the material of the fiber 14 (for example) alumina 14 and the iron-based alloy of the particles 10 is undesirable. This is undesirable because such a material separation in the solid state would result in a "pull-out" effect under macroscopic mechanical stresses on the structural material 8, with absorption of energy by microscopic movements at the interface between the fiber 14 and the particle 16, which has a macroscopic strength-increasing effect and prevents the spread of subcritical crack propagation, which could lead to a calamitous fracture.

LIST OF REFERENCE NUMERALS 2 electric motor
4 stator
6 moving component
7 rotor
8 soft-magnetic structural material
9 laminated stack according to the prior art
10 particles
12 grain boundaries
14 ceramic fibers
16 fiber content
18 fiber length
20 fiber diameter
22 particle diameter
24 Bruggemann approximation
26 conductivity normalized to iron
28 normalized conductivity as a function of fiber content
30 housing

What is claimed is:

1. An electric motor comprising:
   a stator; and
   a moving component comprising an iron-based soft-magnetic structural material including crystallites of a ferromagnetic iron-based alloy separated by grain boundaries,
   wherein there is interlayer-free contact between the crystallites at grain boundaries; and
   wherein the structural material comprises ceramic fibers;
   wherein a content of the ceramic fibers is between 0.2% and 10% by volume; and
   an aspect ratio of the ceramic fibers is less than 0.5.

2. The electric motor as claimed in claim 1, wherein the fiber content is between 0.2% and 5% by volume.

3. The electric motor as claimed in claim 1, wherein the fiber content is between 2% and 4% by volume.

4. The electric motor as claimed in claim 1, wherein the aspect ratio of the ceramic fibers is less than 0.1.

5. The electric motor as claimed in claim 1, wherein the aspect ratio of the fibers is less than 0.2.

6. The electric motor as claimed in claim 1, wherein the ceramic fibers comprise alumina fibers.

7. The electric motor as claimed in claim 1, wherein the ceramic fibers have a length between 70 μm and 300 μm.

8. The electric motor as claimed in claim 1, wherein the ceramic fibers have a length between 70 μm and 150 μm.

9. The electric motor as claimed in claim 1, wherein the ceramic fibers have a diameter between 4 μm and 10 μm.

10. The electric motor as claimed in claim 1, wherein the ceramic fibers have a diameter between 5 μm and 7 μm.

11. The electric motor as claimed in claim 1, wherein 80% of the crystallites have a particle diameter greater than 10 μm.

12. The electric motor as claimed in claim 1, wherein the moving component comprises a rotor.

13. The electric motor as claimed in claim 1, wherein the soft-magnetic structural material (8) has been produced by a hot isostatic pressing method.

14. The electric motor as claimed in claim 1, wherein the soft-magnetic structural material has been produced by a cold isostatic pressing method, followed by sintering.

15. The electric motor as claimed in claim 1, wherein the soft-magnetic structural material has been produced by a paste-based method.

* * * * *